United States Patent
Bayston et al.

(10) Patent No.: US 10,139,983 B2
(45) Date of Patent: Nov. 27, 2018

(54) CONTROLLING ACCESS TO CONTENT

(71) Applicant: Microsoft Technology Licensing, LLC, Redmond, WA (US)

(72) Inventors: Stuart A. Bayston, Rugby (GB); Guilherme Schneider, London (GB); Daniel Winston, Warrington (GB); Richard James West, London (GB); Daniele Pizziconi, Stockholm (SE)

(73) Assignee: Microsoft Technology Licensing, LLC, Redwood, WA (US)

( * ) Notice: Subject to any disclaimer, the term of this patent is extended or adjusted under 35 U.S.C. 154(b) by 220 days.

(21) Appl. No.: 14/700,077

(22) Filed: Apr. 29, 2015

(65) Prior Publication Data

US 2016/0216874 A1 Jul. 28, 2016

(30) Foreign Application Priority Data

Jan. 22, 2015 (GB) .................................. 1501079.6

(51) Int. Cl.
 *G06F 3/0484* (2013.01)
 *G06F 3/0486* (2013.01)
 (Continued)

(52) U.S. Cl.
 CPC ........ *G06F 3/0481* (2013.01); *G06F 3/04842* (2013.01); *G06F 3/04883* (2013.01); *G06F 2203/04803* (2013.01)

(58) Field of Classification Search
 CPC ......... G06F 2203/04803; G06F 3/0481; G06F 3/04842; G06F 3/04847; G06F 3/0486; G06F 3/0488; G06F 3/04883
 See application file for complete search history.

(56) References Cited

U.S. PATENT DOCUMENTS 7,797,645 B2 9/2010 Stevens et al.
8,689,189 B1 4/2014 Cansizlar
(Continued)

FOREIGN PATENT DOCUMENTS

EP 2669786 A2 12/2013

OTHER PUBLICATIONS

"Second Written Opinion", Application No. PCT/US2016/014408, dated Dec. 21, 2016, 6 pages.
(Continued)

*Primary Examiner* — Amy Ng
*Assistant Examiner* — Tan H Tran
(74) *Attorney, Agent, or Firm* — Schwegman Lundberg & Woessner, P.A.

(57) ABSTRACT

A user terminal comprising: a display having an available display area; a processor configured to run a client application having a user interface capable of operating in a full screen mode whereby a single layer of content is displayed in the available display area or in a split-view mode; wherein the client application is configured to: detect, while controlling the user interface to operate in the full screen mode, a user selection that the user interface operates in the split-view mode, and in response display a first layer of content in a predetermined position to partially overlap a second layer of content such that a portion of the second layer of content is displayed in the available display area and a remaining portion of the second layer of content is not displayed; and display an indicator providing an indication of how content displayed on the two layers is related.

21 Claims, 6 Drawing Sheets

(51) Int. Cl.
*G06F 3/0488* (2013.01)
*G06F 3/0481* (2013.01)

(56) References Cited

U.S. PATENT DOCUMENTS

| | | | |
|---|---|---|---|
| 8,751,572 | B1 | 6/2014 | Behforooz et al. |
| 8,832,569 | B2 | 9/2014 | Chen et al. |
| 2009/0313334 | A1 | 12/2009 | Seacat et al. |
| 2010/0199340 | A1 | 8/2010 | Jonas et al. |
| 2010/0217808 | A1 | 8/2010 | Benninger |
| 2010/0267369 | A1 | 10/2010 | Lim et al. |
| 2012/0131497 | A1* | 5/2012 | Jitkoff .............. G06F 3/0481 715/786 |
| 2013/0159941 | A1* | 6/2013 | Langlois ............ G06F 3/017 715/863 |
| 2013/0219299 | A1 | 8/2013 | Yerli |
| 2013/0326421 | A1* | 12/2013 | Jo .................. G06F 3/0482 715/841 |
| 2014/0089822 | A1 | 3/2014 | Wu et al. |
| 2014/0235222 | A1 | 8/2014 | Gonen et al. |
| 2015/0227166 | A1* | 8/2015 | Lee ................. G06F 1/169 345/173 |
| 2015/0248199 | A1* | 9/2015 | Lemay .............. G06F 3/0482 715/784 |

OTHER PUBLICATIONS

"Beejive", Retrieved From: <http://www.beejive.com/support/blackberry/2.0/index.htm?s=chats> Nov. 19, 2014, 2 pages.

"Facebook's New Chat Sidebar Feature", Retrieved From: <http://www.hyperarts.com/blog/facebook-new-chat-sidebar-design-layout/> Nov. 19, 2014, Jul. 8, 2011, 20 pages.

"How can I open IM Conversations in New Windows in Skype for Mac OS X?", Retrieved From: <https://support.skype.com/en/faq/FA12173/how-can-i-open-im-conversations-in-new-windows-in-skype-for-mac-os-x> Nov. 19, 2014, Sep. 22, 2014, 5 pages.

Hodges,"News for Mac and iOS users. Big news", Retrieved From: <http://blogs.atlassian.com/2013/06/new-release-of-hipchat-for-mac-and-ios/> Nov. 19, 2014, Jun. 25, 2013, 4 pages.

Mitroff,"Four Android Messaging Apps with a Little Something Extra", Retrieved From: <http://www.cnet.com/news/android-text-messaging-apps/> Feb. 25, 2015, Aug. 21, 2014, 5 pages.

"International Search Report and Written Opinion Issued in PCT Application No. PCT/US2016/014408", dated Apr. 28, 2016, 11 Pages.

"International Preliminary Report on Patentability", Application No. PCT/US2016/014408, dated Apr. 7, 2017, 7 pages.

\* cited by examiner

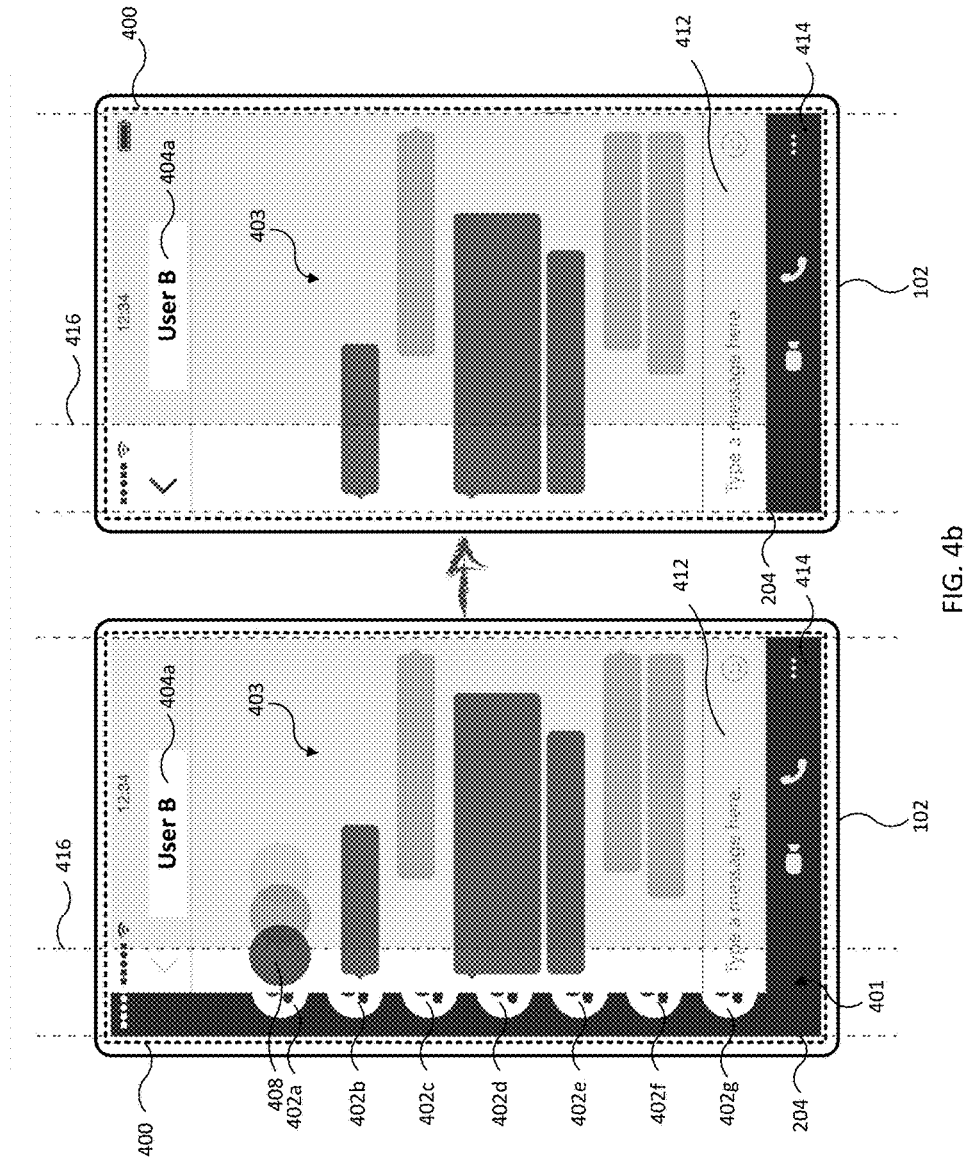

CONTROLLING ACCESS TO CONTENT

RELATED APPLICATIONS

This application claims priority under 35 USC § 119 or § 365 to Great Britain Patent Application No. 1501079.6, filed Jan. 22, 2015, the disclosure of which is incorporated in its entirety.

BACKGROUND

It is known for client application software to be executed on one or more processors of a computing device to enable the application to provide functionality to a user of the computing device.

A client application provides content to an operating system executed on the one or more processors of the computing device. The operating system is responsible for rendering this content in a user interface provided by the client application that is displayed on a display of the computing device. The content displayed in the user interface is controlled by the user of the computing device using an input device of the computing device. The operating system is responsible for communicating detected input selections to the client application such that the client application can deliver appropriate content to the display via the operating system based on the input selections.

The navigation history of a client application is represented as a last-in, first-out structure commonly called a stack, backstack, or navigation backstack, as it contains layers of content (e.g. levels) in a stack structure that represents the back navigation of the client application. This stack is stored in memory of the computing device.

As a user navigates through layers of content in the client application, these layers of content are added to this stack. The last layer of content that is added to the stack (based on a user making a selection in the user interface provided by the client application) is the first layer of content that can be removed. A layer of content can be retrieved from the stack only by removing layers one at a time from the top of the stack (for example by the user iteratively pressing a 'back' button). The single layer of content at the top of the stack is displayed on the display of the computing device.

A wide variety of genres of client applications exist including social media, gaming, news & weather, e-commerce etc.

SUMMARY

The inventor has recognised that known client applications consumes a large amount of processor resource (e.g. processor cycles) when a user navigates through a user interface provided by the particular client application. This in turn increases the power consumption of the computing device, which is particularly problematic when the computing device is a mobile device with a limited battery life.

For example a known client application may display a first layer of content in the user interface provided by the client application which displays a plurality of selectable inputs (e.g. icons, tabs, buttons, images, text etc.). In response to detecting a user selection of one of these selectable inputs, the known client application is configured to add a further layer of content to the stack and provide the further layer of content to the operating system for rendering on the display to replace the first layer of content. In response to detecting a user selection to return to the first layer of content, the known client application is configured to remove the further layer of content from the stack and provide the first layer of content to the operating system for rendering on the display to replace the further layer of content. The navigation between the first layer of content and further layers of content requires the re-rendering of the first layer of content each time the user selects to return to the first layer of content as only a single layer of content is rendered on the display at any one time, and this incurs a large amount of processor resource.

According to one aspect of the present disclosure there is provided a user terminal comprising: a display having an available display area; one or more processors configured to run a client application having a user interface capable of operating in a full screen mode whereby a single layer of content is displayed in the available display area or in a split-view mode to display content; wherein the client application is configured to: detect, whilst controlling the user interface to operate in the full screen mode, a user selection that the user interface operates in the split-view mode, and in response display a first layer of content in a predetermined position to partially overlap a second layer of content in the available display area such that a portion of the second layer of content is displayed in the available display area and a remaining portion of the second layer of content is not displayed in the available display area; and display an indicator providing an indication of how content displayed on the first layer of content is related to content displayed on the portion of the second layer of content.

According to another aspect of the present disclosure there is provided at least one computer readable medium storing a client application having a user interface and which, when executed on one or more processors of a user terminal comprising a display having an available display area, is configured to: detect, whilst controlling the user interface to operate in a full screen mode whereby a single layer of content is displayed in the available display area, a user selection that the user interface operates in a split-view mode, and in response display a first layer of content in a predetermined position to partially overlap a second layer of content in the available display area such that a portion of the second layer of content is displayed in the available display area and a remaining portion of the second layer of content is not displayed in the available display area; and display an indicator providing an indication of how content displayed on the first layer of content is related to content displayed on the portion of the second layer of content.

According to another aspect of the present disclosure there is provided a method implemented by a client application having a user interface, the method implemented by the client application when executed on one or more processors of a user terminal comprising a display having an available display area, the method comprising: detecting, whilst controlling the user interface to operate in a full screen mode whereby a single layer of content is displayed in the available display area, a user selection that the user interface operates in a split-view mode, and in response displaying a first layer of content in a predetermined position to partially overlap a second layer of content in the available display area such that a portion of the second layer of content is displayed in the available display area and a remaining portion of the second layer of content is not displayed in the available display area; and displaying an indicator providing an indication of how content displayed on the first layer of content is related to content displayed on the portion of the second layer of content.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Nor is the claimed subject matter limited to implementations that solve any or all of the disadvantages noted in the Background section.

BRIEF DESCRIPTION OF DRAWINGS

For a better understanding of the present subject matter and to show how the same may be carried into effect, reference will now be made by way of example to the accompanying drawings in which:

FIGS. 4a-c illustrates communication client user interfaces provided in accordance with exemplary embodiments of the present disclosure.

DETAILED DESCRIPTION

Embodiments will now be described by way of example only.

Whilst embodiments of the present disclosure are applicable to any genre of client application that is executed on a user terminal (computing device), embodiments are described below with reference to a Voice over internet protocol ("VoIP") communication client application that allows the user of a user terminal (on which the communication client application is executed) to make voice calls and other communication events (e.g. video calls, instant messages ("IM"), file transfers etc.) across a communication network to other users that have installed and executed the communication client application on their device. To use VoIP, the user must install and execute client software on their device. The client software provides the VoIP connections as well as other functions such as registration and authentication.

Figure 1:
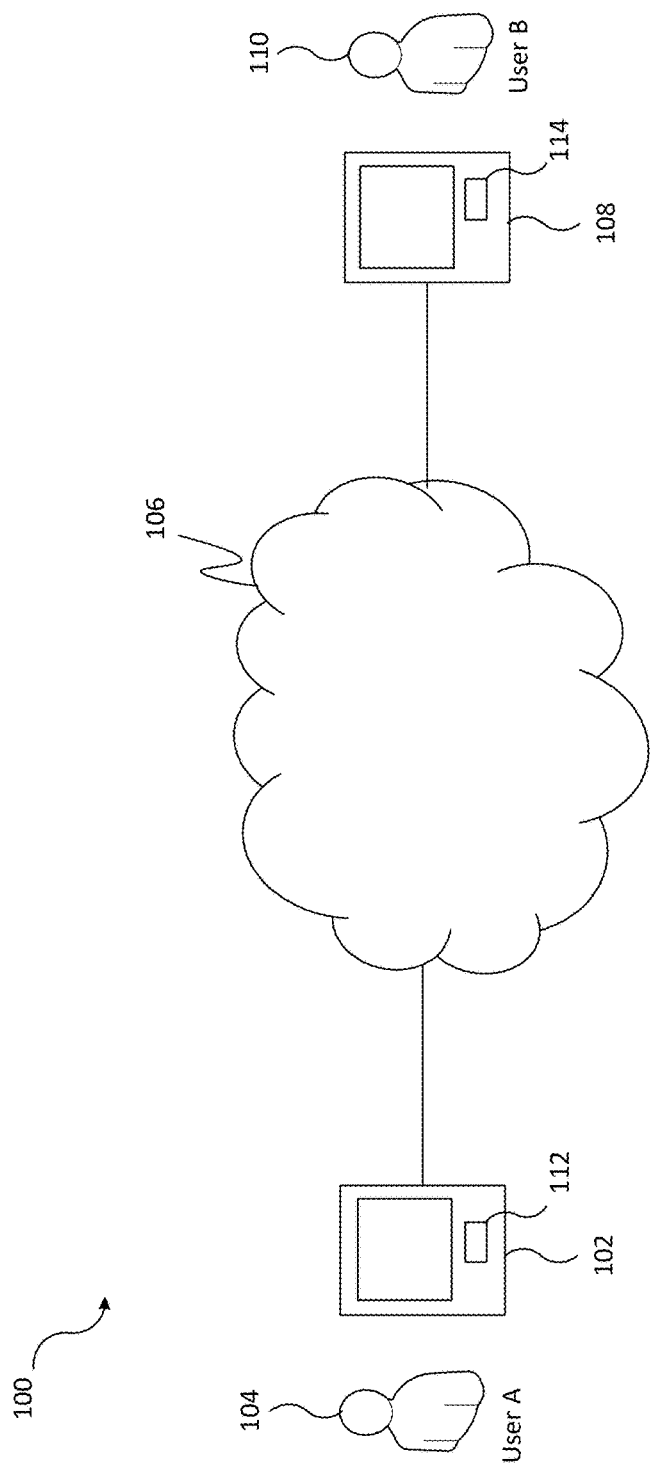
FIG. 1 is a schematic illustration of a communication system.

FIG. 1 shows a communication system 100 comprising a first user 104 (User A) who is associated with a user terminal 102 and a second user 110 (User B) who is associated with a user terminal 108. The user terminals 102 and 108 can communicate over a communication network 106 in the communication system 100, thereby allowing the users 104 and 110 to communicate with each other over the communication network 106. The communication network 106 may be any suitable network which has the ability to provide a communication channel between the user terminal 102 and the second user terminal 108. For example, the communication network 106 may be the Internet or another type of network such as a High data rate mobile network, such as a 3rd generation ("3G") mobile network.

Note that in alternative embodiments, user terminals can connect to the communication network 106 via an additional intermediate network not shown in FIG. 1. For example, if the user terminal 102 is a mobile device, then it can connect to the communication network 106 via a cellular mobile network (not shown in FIG. 1), for example a GSM or UMTS network.

The user terminal 102 may be, for example, a mobile phone, a personal digital assistant ("PDA"), a personal computer ("PC") (including, for example, Windows™, Mac OS™ and Linux™ PCs), a tablet computer, a gaming device or other embedded device able to connect to the communication network 106. The user terminal 102 is arranged to receive information from and output information to User A 104.

The user terminal 102 executes a communication client application 112, provided by a software provider associated with the communication system 100. The communication client application 112 is a software program executed on a local processor in the user terminal 102. The communication client application 112 performs the processing required at the user terminal 102 in order for the user terminal 102 to transmit and receive data over the communication system 100. The communication client application 112 executed at the user terminal 102 may be authenticated to communicate over the communication system through the presentation of digital certificates (e.g. to prove that user 104 is a genuine subscriber of the communication system—described in more detail in WO 2005/009019).

The user terminal 108 may correspond to the user terminal 102. The user terminal 108 executes, on a local processor, a communication client application 114 which corresponds to the communication client application 112 executed at the user terminal 102. The communication client application 114 at the user terminal 108 performs the processing required to allow User 110 to communicate over the network 106 in the same way that the communication client application 112 at the user terminal 102 performs the processing required to allow the User A 104 to communicate over the network 106. The user terminals 102 and 108 are end points in the communication system.

FIG. 1 shows only two users (104 and 110) and two user terminals (102 and 108) for clarity, but many more users and user devices may be included in the communication system 100, and may communicate over the communication system 100 using respective communication clients executed on the respective user devices, as is known in the art.

Figure 2:
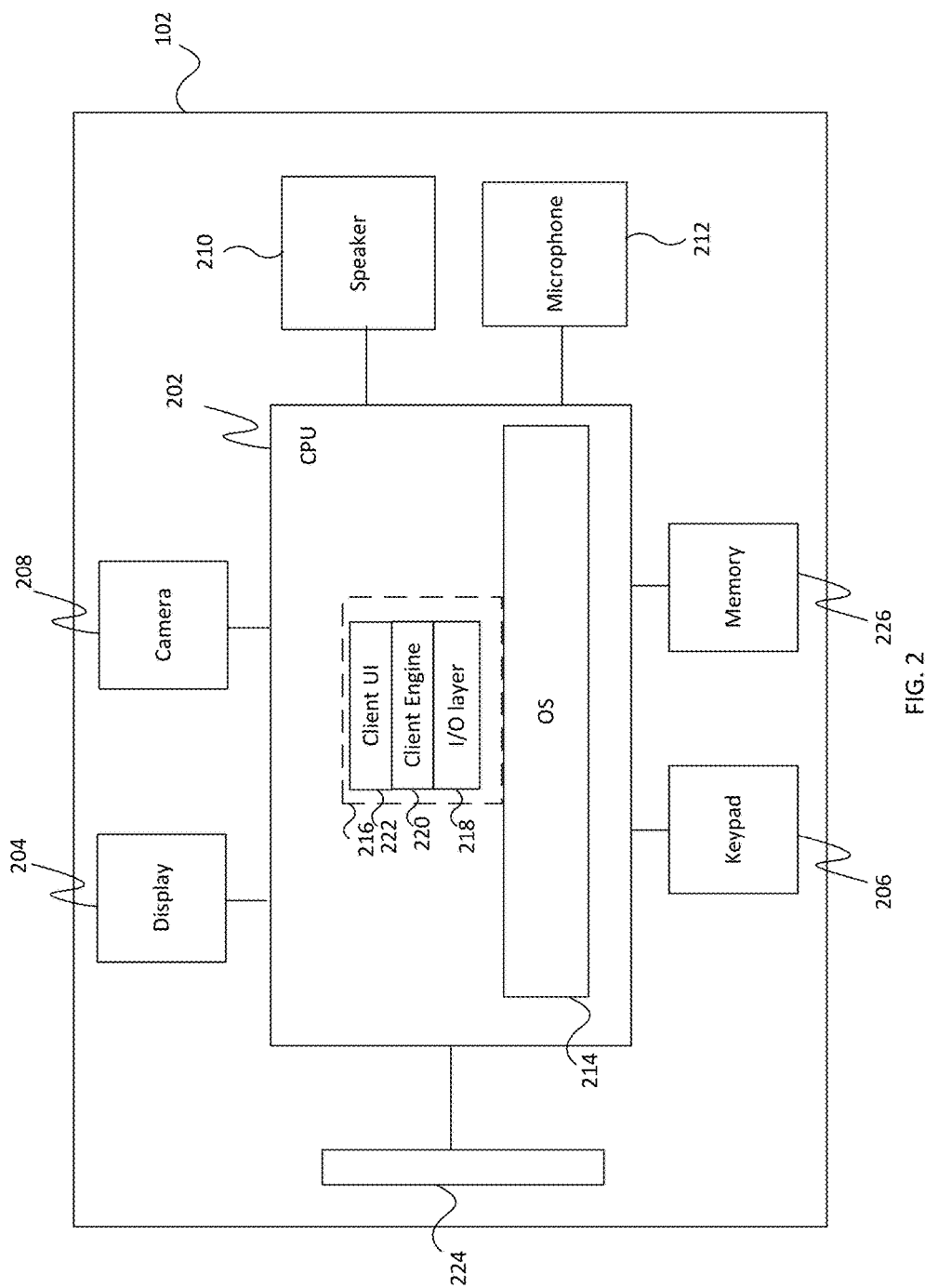
FIG. 2 is a schematic block diagram of a user terminal.

FIG. 2 illustrates a detailed view of the user terminal 102 on which is executed a communication client application for communicating over the communication system 100. The user terminal 102 comprises a central processing unit ("CPU") 202, to which is connected a display 204 such as a screen or touch screen, input devices such as a keypad 206, a camera 208, and touch screen 204. In embodiments described below the camera 208 may be a conventional webcam that is integrated into the user terminal 102, or coupled to the user device via a wired or wireless connection. Alternatively, the camera 208 may be a depth-aware camera such as a time of flight or structured light camera. An output audio device 210 (e.g. a speaker) and an input audio device 212 (e.g. a microphone) are connected to the CPU 202. The display 204, keypad 206, camera 208, output audio device 210 and input audio device 212 may be integrated into the user terminal 102 as shown in FIG. 2. In alternative user terminals one or more of the display 204, the keypad 206, the camera 208, the output audio device 210 and the input audio device 212 may not be integrated into the user terminal 102 and may be connected to the CPU 202 via respective interfaces. One example of such an interface is a USB interface. The CPU 202 is connected to a network interface 224 such as a modem for communication with the communication network 106. The network interface 224 may be integrated into the user terminal 102 as shown in FIG. 2. In alternative user terminals the network interface 224 is not integrated into the user terminal 102. The user terminal 102 also comprises a memory 226 for storing data as is known in the art. The memory 226 may be a permanent memory, such as ROM. The memory 226 may alternatively be a temporary memory, such as RAM.

The user terminal 102 is installed with the communication client application 112, in that the communication client application 112 is stored in the memory 226 and arranged for execution on the CPU 202. The memory 226 may also store navigation history associated with the communication client application 112. FIG. 2 also illustrates an operating system ("OS") 214 executed on the CPU 202. Running on top of the OS 214 is a software stack 216 for the communication client application 112 referred to above. The software stack shows an I/O layer 218, a client engine layer 220 and a client user interface layer ("UI") 222. Each layer is responsible for specific functions. Because each layer usually communicates with two other layers, they are regarded as being arranged in a stack as shown in FIG. 2. The operating system 214 manages the hardware resources of the computer and handles data being transmitted to and from the communication network 106 via the network interface 224. The I/O layer 218 comprises audio and/or video codecs which receive incoming encoded streams and decodes them for output to speaker 210 and/or display 204 as appropriate, and which receive unencoded audio and/or video data from the microphone 212 and/or camera 208 and encodes them for transmission as streams to other end-user terminals of the communication system 100. The client engine layer 220 handles the connection management functions of the VoIP system as discussed above, such as establishing calls or other connections by server-based or P2P address look-up and authentication. The client engine may also be responsible for other secondary functions not discussed herein. The client engine 220 also communicates with the client user interface layer 222. The client engine 220 may be arranged to control the client user interface layer 222 to present information to the user of the user terminal 102 via the user interface of the communication client application 112 which is displayed on the display 204 and to receive information from the user of the user terminal 102 via the user interface.

FIG. 2 shows one CPU but as an alternative, the user terminal 102 may comprise more than one CPU e.g. which constitute cores of a multi-core processor.

Figure 3:
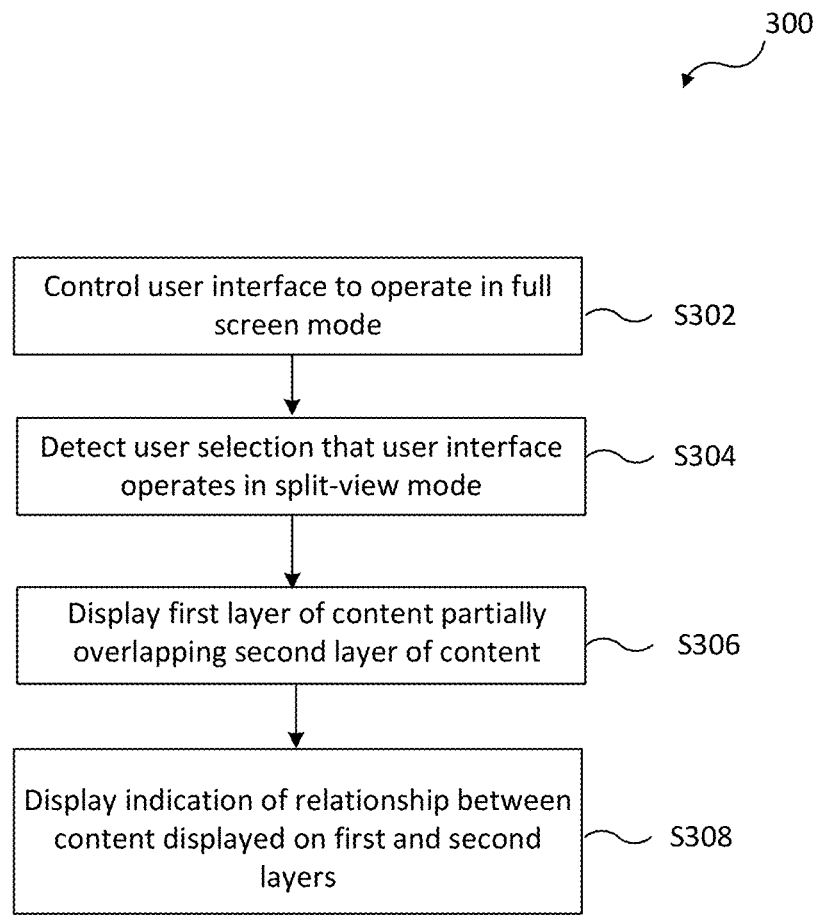
FIG. 3 is flow chart for a process performed by a communication client application when executed on the user terminal.

Reference is now made to FIG. 3 which is a flow chart for a process 300 performed by the communication client application 112 when executed on the user terminal 102. The process 300 will first be described with reference to FIGS. 4a-c which illustrate exemplary client user interfaces presented in various embodiments as part of the process 300.

In embodiments of the present disclosure, the user interface provided by the communication client application 112 can operate in one of at least two modes. The first mode is a "full screen" mode in which a single layer of content provided by the communication client application 112 is displayed on the display 204. The second mode is a "split view" mode in which both a first layer of content and a second layer of content provided by the communication client application 112 are displayed on the display 204.

At step S302, the communication client application 112 controls the user interface provided by the communication client application 112 to operate in the full screen mode.

Figure 4A:
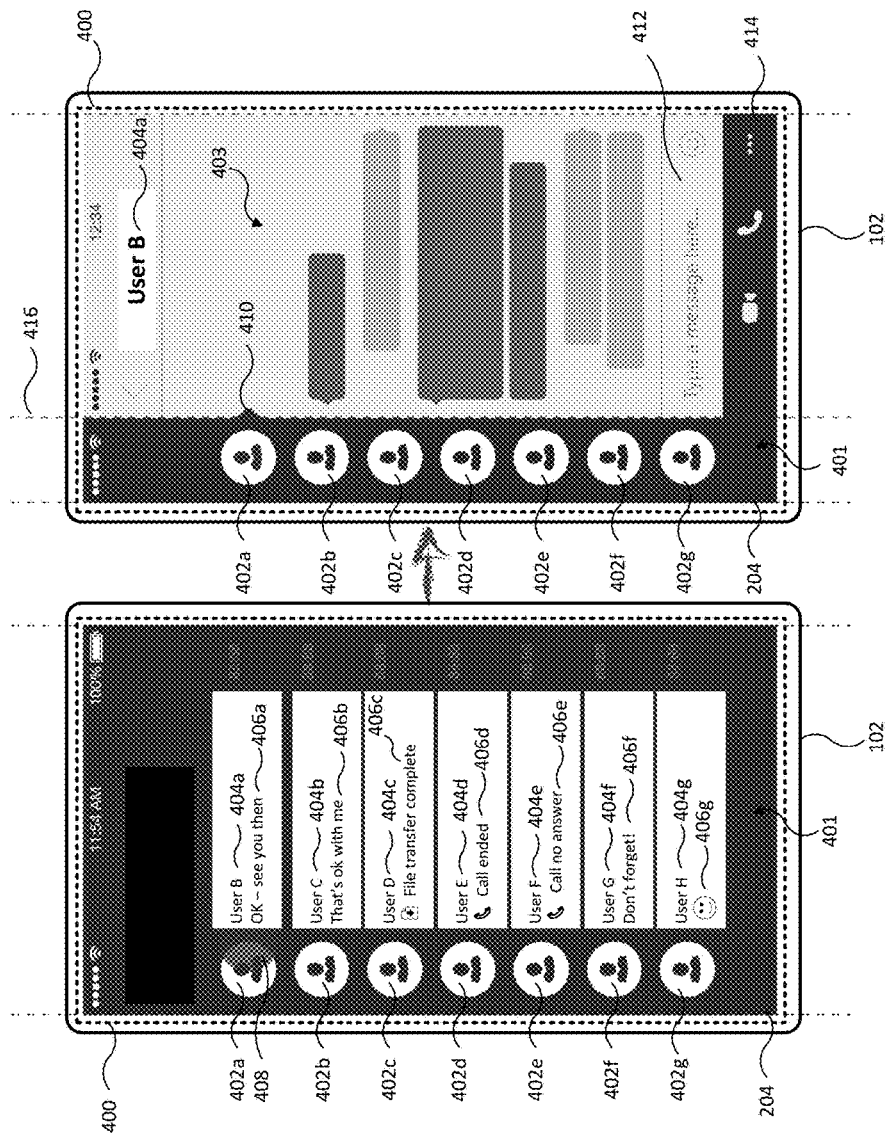

The left-hand illustration of FIG. 4a illustrates the client user interface displaying a layer of content 401 in an available area 400 of the display 204 responsive to the communication client application 112 supplying a single layer of content to the OS 214 for rendering on the display 204. This layer of content 401 is stored at the top of the navigation backstack associated with the communication client application 112.

As a mere example, the layer of content 401 displayed on the display 204 when the communication client application 112 controls the user interface provided by the communication client application 112 to operate in the full screen mode may comprise information pertaining to the recent communication activity associated with User A 104 within a predetermined period. "Recent" activity is typically meant time-ordered information, with most recent activity being displayed first in a list or most prominently, and less recent activity being displayed later in a list or at a less-prominent position.

FIG. 4a illustrates that User A 104 has recent communication activity with Users B-G of the communication system 100. The displayed recent activity may include for example avatars 402 (which are images chosen by users to represent themselves within the VoIP system) of those users that User A 104 has had recent communication activity with, the usernames 404 of those users that User A 104 has had a recent communication session with, and information 406 pertaining to the last communication event in the communication session conducted with the respective users e.g. last IM message received, contact acceptance, missed call etc.

FIG. 4a illustrates (i) an avatar 402a and username 404a associated with User B 110 and information 406a pertaining to the last communication event (e.g. an exchanged IM) in the communication session conducted with User B 110; (ii) an avatar 402b and username 404b associated with a User C and information 406b pertaining to the last communication event (e.g. an exchanged IM) in the communication session conducted with User C; (iii) an avatar 402c and username 404c associated with a User D and information 406c pertaining to the last communication event (e.g. an exchanged file) in the communication session conducted with User D; (iv) an avatar 402d and username 404d associated with a User E and information 406d pertaining to the last communication event (e.g. end of a voice call) in the communication session conducted with User E (v) an avatar 402e and username 404e associated with a User F and information 406e pertaining to the last communication event (e.g. an unanswered voice call) in the communication session conducted with User F; (vi) an avatar 402f and username 404f associated with a User G and information 406f pertaining to the last communication event (e.g. an exchanged IM) in the communication session conducted with User G; and (vii) an avatar 402g and username 404g associated with a User H and information 406g pertaining to the last communication event (e.g. an exchanged IM) in the communication session conducted with User H.

Whilst the recent activity of User A 104 has been described above with reference to communication sessions conducted with a single user over the communication system 100. It will be appreciated that the recent activity may include information on recent group communication sessions (that include three or more users) that User A 104 has participated in.

User A 104 is able to select a selectable input displayed on the layer of content 401 using an input device of the user terminal 102 to view more detailed information on one of the communication sessions. For example, by using a keypad 206, moving a cursor displayed on the display 204 by physically moving a mouse (not shown in FIG. 2) coupled to the user terminal 102, or touching an area of the display 204 if the display 204 is a touch screen.

The selectable input may for example be an avatar 402, a username 404 or a predetermined area of the displayed layer of content surrounding a particular avatar 402, username 404 and information 406 associated with a communication session.

At step S304, the communication client application 112 detects a user selection that the user interface provided by the communication client application 112 operates in the split-view mode. This may be based on detecting selection of a selectable input that is displayed on the layer of content 401 that is displayed when the communication client application 112 is operating in the full screen mode.

An example user selection is indicated in FIG. 4a by the circle 408 which represents an area of the display 204 (a touch screen) that has been tapped by User A 104 using their finger or other computing instrument used to input command to the touch screen (such as a stylus). FIG. 4a illustrates that User A has selected to view more detailed information on the communication session with User B 110.

A known communication client application would be configured in response to detecting this user selection, to add a further layer of content comprising detailed information on the communication session with User B 110 to the navigation backstack and provide the further layer of content to the OS for rendering on the display. The default behaviour of the OS is to display the further layer in full screen mode. That is to replace the layer of content displaying the recent communication activity associated with User A 104 with the further layer of content.

In contrast to known solutions, in response to detecting the user selection at step S304, the process 300 proceeds to step S306 whereby the communication client application 112 controls the user interface provided by the communication client application 112 to operate in the split-view mode (depicted in the right-hand illustration of FIG. 4a).

That is, the communication client application 112 adds a further layer of content 403 to the navigation backstack (on top of the layer of content 401) and provides both the lower layer of content 401 and the upper further layer of content 403 comprising detailed information on the communication session with User B 110 e.g. a chat view featuring all conversation and call history with User B 110, to the OS 214 for rendering on the display 204 in the available display area 400. The communication client application 112 controls the OS 214 to render the further layer of content 403 in a predetermined position in the available display area 400 to partially overlap the layer of content 401 displaying the recent communication activity associated with User A 104. That is, the communication client application 112 controls the OS 214 to operate in accordance with a custom behaviour (such that the OS 214 does not display the further layer 403 in accordance with its default behaviour).

The above described interaction between the OS 214 and the communication client application 112 is based on the OS 214 exposing at least one API (application programming interface) that the communication client application 112 can use to implement custom behaviours and interactions that are in accordance with embodiments described herein.

The communication client application 112 is configured to control the OS 214 such that the further layer of content 403 is scaled (resized) by the OS 214 to fill a portion of the available display area 400 that corresponds to the predetermined position referred to above. This is depicted in the right-hand illustration of FIG. 4a.

The predetermined position referred to above is dependent on the content displayed on the layer of content 401. For example, if the lower layer of content (e.g. the layer of content 401) comprises a plurality of selectable inputs, then the upper layer of content (e.g. the further layer of content 403) may overlap the lower layer of content to leave the plurality of selectable inputs exposed and displayed on the display 204.

Thus as shown in FIG. 4a, due to this partial overlapping, a portion of the layer of content 401 is displayed in the available display area 400 and a remaining portion of the layer of content 401 is not displayed in the available display area 400 (even though it is being rendered for display on the display 204 by the OS 214). The dashed line 416 shown in FIG. 4a corresponds to a lock point which separates these separate portions. The position of this lock point 416 is controlled by the communication client application 112.

The portion of the layer of content 401 that is displayed in the available display area 400 comprises selectable inputs (e.g. avatars 402 of the users that User A 104 has had recent communication activity with) that may be selected by User A 104. That is, the partial overlapping of the further layer of content 403 on top of the layer of content 401 displaying the recent communication activity associated with User A 104 creates a tabbed sidebar comprising these selectable inputs.

The further layer of content 403 displaying detailed information on the communication session with User B 110 in the available display area 400 illustrated in FIG. 4a shows IM messages previously exchanged between User A 104 and User B 110 however this chat view may include other information such as call history information (placed calls, end of calls, missed calls) and file transfer information.

The further layer of content 403 comprises a message field 412 into which User A 104 can enter text using the keypad 206 or by tapping an area of the display 204 (a touch screen) when a virtual keypad is displayed on the display 204.

The further layer of content 403 comprises a toolbar 414 which displays selectable inputs for initiating a communication event with User B 110 (e.g. to place a voice or video call to User B 110) and a selectable menu button which may provide User A 104 with one or more selectable options pertaining to the functionality provided by the communication client application (e.g. to add User B 110 to a favourite contacts list, to edit contact information for User B 110, to view profile information of User B 110, to block further communication with User B 110, to remove User B 110 as a contact).

At step S308, the communication client application 112 controls the user interface provided by the communication client application 112 to display an indicator 410 providing an indication of how content displayed on the further layer of content 403 is related to content on the displayed portion of the layer of content 401. As shown in FIG. 4a, the indicator 410 provides an indication that the communication session information displayed on the further layer of content 403 relates to a communication session with User B 110 due to the indicator 410 being displayed adjacent to the avatar 402a of User B 110 (rather than adjacent to the avatars 402b-g of the other users that User A 104 has had recent communication activity with).

It will be appreciated that the form of the indicator 410 shown in FIG. 4a is merely an example and may take other forms.

Whist FIG. 4a shows the indicator 410 being displayed on the further layer of content 403, additionally or alternatively the indicator 410 may be displayed on the layer of content 401 displaying the recent communication activity associated with User A 104.

For example, in the scenario whereby the indicator 410 is displayed on the layer of content 401, the communication client application 112 may control the user interface provided by the communication client application 112 to display the indicator 410 at a position on the layer of content 401 to indicate that the communication session information displayed on the further layer of content 403 relates to a communication session with User B 110 (for example the indicator 410 may be displayed adjacent to, on, or around the avatar 402a associated with User B 110.

The communication client application 112 may display the indicator 410 on the layer of content 401 in a particular colour, and additionally control the further layer of content 403 to be displayed in this particular colour. This providing an indication that content displayed on the further layer of content 403 is related to content on the displayed portion of the layer of content 401.

Whilst the communication client application 112 controls the user interface provided by the communication client application 112 to operate in the split-view mode, User A 104 may select another selectable input (e.g. an avatar 402 other than avatar 402a) that is displayed on the portion of the layer of content 401 (the created tabbed sidebar) that is displayed in the available display area 400 when the communication client application 112 is operating in the split-view mode. In response to detecting this user selection, the communication client application 112 removes the further layer of content 403 from the navigation backstack and adds another further layer of content 403 comprising detailed information on the communication session with the user associated with the selected avatar 402, to the navigation backstack (on top of the layer of content 401) and provides this other further layer of content (along with the layer of content 401) to the the OS 214 for rendering on the display 204 in the available display area 400 in place of the further layer of content 403 in the predetermined position to display detailed information on the communication session with the user associated with the selected avatar 402.

The selectable inputs (e.g. avatars 402) that are displayed on the portion of the layer of content 401 act as tabs to advantageously allow User A 104 to quickly and easily jump between conversations, and see contextual information in the layer of content 401 displaying the recent communication activity associated with User A 104, whilst actively communicating with one or more users. Furthermore, embodiments of the present disclosure negate the need for User A 104 to 'jump' up and down levels of content to navigate through the user interface provided by the communication client application 112 as User A 104 does not need to leave the layer of content that is in focus (the upper further layer of content) to interact with the lower layer of content (e.g. the layer of content 401).

Whilst the communication client application 112 controls the user interface provided by the communication client application 112 to operate in the split-view mode, User A 104 may make a selection to control the user interface provided by the communication client application 112 to operate in the full screen mode to display only the further layer of content 403 in the available area 400 of the display 204. In response to detecting this user selection, with the layer of content 401 displaying the recent communication activity associated with User A 104 still being rendered on the display 204 by the OS 214, the communication client application 112 instructs the OS 214 to render the further layer of content 403 on the display 204 in the available display area 400 to fully overlap the layer of content 401 displaying the recent communication activity associated with User A 104 (such that no portion of the layer of content 401 is displayed in the available display area 400 of the display 204).

That is, whilst the user interface provided by the communication client application 112 operates in the full screen mode, both the layer of content 401 and the further layer of content 403 are rendered on the display 204 by the OS 214, only a single layer of content (the further layer of content 403) provided by the communication client application 112 is displayed on the display 204 due to the overlapping described above.

FIG. 4b illustrates the transition from the user interface provided by the communication client application 112 operating in the split-view mode to operating in the full screen mode in response to a user selection.

This user selection may for example be a dragging of the further layer of content 403 in a direction to fully overlap the layer of content 401 displaying the recent communication activity associated with User A 104.

An example user selection is indicated in FIG. 4b by the circles 408 which represents a finger swipe gesture on an area of the display 204 (a touch screen) that has been made by User A 104 using their finger or other computing instrument used to input command to the touch screen (such as a stylus) to drag the further layer of content in a substantially horizontal direction (right to left in this example). The finger swipe gesture includes the user making contact with the display (a finger-down event), moving the contact from right to left in a substantially horizontal direction across the touch-sensitive surface of the display 204 (a finger-dragging event), and the user ceasing contact with the display 204 (a finger-up (lift off) event). This dragging of the further layer of content 403 may also be implemented by User A 104 moving a cursor displayed on the display 204 by physically moving a mouse (not shown in FIG. 2) coupled to the user terminal 102.

The lock point 416 is associated with a lock threshold area in the available display area 400 which is defined by the communication client application 112. In the example shown in FIG. 4b, the lock threshold area is defined by a left-side edge that is parallel and positioned to the left of the lock point 416, and a right-side edge that is parallel and positioned to the right of the lock point 416 (described with respect to the viewpoint of User A 104 noting that the lock threshold area is not visible to User A 104). In response to detecting a right-to-left finger swipe in which User A 104 swipes out of the lock threshold area (the finger-up event is beyond the left-side edge of the lock threshold area), the communication client application 112 instructs the OS 214 to render the further layer of content 403 on the display 204 in the available display area 400 to fully overlap the layer of content 401 displaying the recent communication activity associated with User A 104.

The communication client application 112 controls the OS 214 to move the left hand edge of the further layer of content 403 horizontally from right to left (as viewed by User A 104) along a fixed axis as User A 104 makes the right-to-left finger swipe. The communication client application 112 is further configured to control the OS 214 such that the content displayed on the further layer of content 403 when the user interface provided by the communication client application 112 operates in the split-view mode is scaled-up in size by the OS 214 as the further layer of content 403 is expanded in size. The further layer of content 403 (after scaling) is displayed in the user interface provided by the communication client application 112 operating in full screen mode. This is depicted in the right-hand illustration of FIG. 4b.

This allows User A 104, to view or continue to participate in, a recent communication session conducted with a user in a full screen view, which is particularly advantageously when the user terminal 102 is mobile device with a limited screen size.

Whilst the user selection to control the user interface provided by the communication client application 112 to operate in the full screen mode by dragging the further layer of content in a substantially horizontal direction has been described above with reference to a finger swipe gesture, this is merely an example. Embodiments extend to other user selections such as one or more taps on an area of the display 204 (a touch screen) by User A 104 using their finger or other computing instrument used to input command to the touch screen (such as a stylus), using keypad 206, or other input device such as a mouse.

User A 104 can drag back the previously created tabbed sidebar comprising the selectable inputs at any point allowing for quick and easy switching between the recent communication sessions.

In response to detecting dragging of the left hand edge of the further layer of content 403 in a direction to expose the layer of content 401 (e.g. a left-to-right finger swipe) whereby the dragging gesture ends within the lock threshold area (not beyond the right-side edge of the lock threshold area), the communication client application 112 controls the user interface provided by the communication client application 112 to operate in the split-view mode (depicted in the right-hand illustration of FIG. 4a). When the dragging gesture is a finger swipe, the communication client application 112 determines where the dragging gesture ends based on an area in the available display area that the swipe reaches prior to the user ceasing contact with the display 204. When the dragging gesture is implemented by User A 104 moving a cursor displayed on the display 204 by physically moving a mouse, the communication client application 112 determines where the dragging gesture ends based on an area in the available display area that the cursor reaches prior to the user releasing a button on the mouse.

The communication client application 112 controls the OS 214 to move the left hand edge of the further layer of content 403 horizontally from left to right (as viewed by User A 104) along the fixed axis as User A 104 makes the left-to-right finger swipe. The communication client application 112 may be further configured to control the OS 214 such that the content displayed on the further layer of content 403 when the user interface provided by the communication client application 112 operates in the full screen mode, is scaled-down in size by the OS 214 and displayed in the user interface provided by the communication client application 112 operating in the split-view mode. Alternatively, the communication client application 112 may not control the OS 214 to perform any scaling such that the further layer content 403 retains a fixed size so that content displayed along the right-hand side of the further layer of content 403 is cut-off and not displayed in the available display area 400.

Figure 4C:
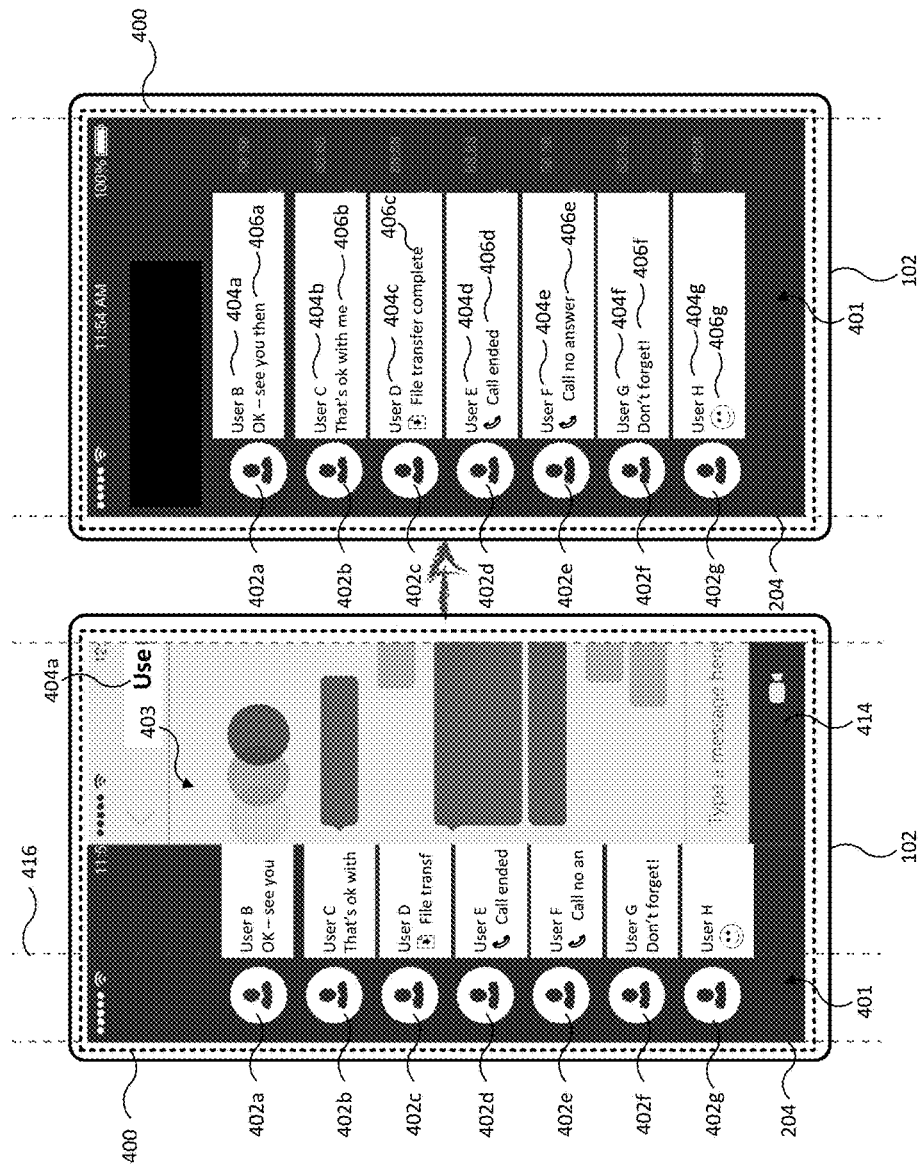

In response to detecting dragging of the left hand edge of the further layer of content 403 in a direction to expose the layer of content 401 (e.g. a left-to-right finger swipe) whereby the dragging gesture ends out of the lock threshold area (beyond the right-side edge of the lock threshold area), the communication client application 112 removes the further layer of content 403 from the navigation backstack to control the user interface provided by the communication client application 112 to not display the further layer of content 403 and reveal the lower layer of content 401 displaying the recent communication activity associated with User A 104 that has been rendered on the display 204 by the OS 214. This is illustrated in FIG. 4c.

In this scenario, the user interface provided by the communication client application 112 maintains operating in the full screen mode in which a single layer of content provided by the communication client application 112 is displayed on the display 204. Prior to the left-to-right finger swipe, the communication client application 112 provides both the layer of content 401 displaying the recent communication activity associated with User A 104 and the further layer of content 403 to the OS 214 for rendering on the display 204, but due to the communication client application 112 instructing the OS 214 to completely overlapping the layer of content 401 with the upper further layer of content 403, no portion of the layer of content 401 is displayed. After the left-to-right finger swipe, the communication client application 112 provides only the layer of content 401 displaying the recent communication activity associated with User A 104 to the OS 214 for rendering on the display 204.

Whilst the user selection detected whilst the user interface provided by the communication client application 112 is controlled to operate in the full screen mode has been described above with reference to a finger swipe gesture, this is merely an example. Embodiments extend to other user selections such as one or more taps on an area of the display 204 (a touch screen) by User A 104 using their finger or other computing instrument used to input command to the touch screen (such as a stylus), using keypad 206, or other input device such as a mouse.

In embodiments of the present disclosure, the communication client application 112 continually provides the layer of content 401 displaying the recent communication activity associated with User A 104 to the OS 214 for rendering on the display 204. In dependence on the navigation through the user interface provided by the communication client application 112, the layer of content 401 may be fully displayed on the display 204, partially displayed on the display 204 (due to the further layer of content 403 being rendered partially on top of the layer of content 401, or not displayed at all on the display 204.

Thus the layer of content 401 does not have to be re-rendered by the OS 214 each time User A 104 navigates through the user interface provided by the communication client application 112 to view this content. This advantageously reduces the amount of processor resource that is incurred when User A 104 navigates through the user interface provided by the communication client application 112.

Whilst the communication client application 112 controls the user interface provided by the communication client application 112 to operate in the split-view mode, the portion of the layer of content 401 that is displayed in the available display area 400 is still able to alert User A 104 to activity (e.g. incoming communication events) happening behind the layer of content that is in focus (e.g. the upper further layer of content 403).

For example, the selectable inputs displayed on the portion of the layer of content 401 that is displayed in the available display area 400 may be dynamically re-arranged by the communication client application 112. That is, if User A 104 receives a communication event (e.g. an instant message) from a user (e.g. a User I) that User A 104 has not had recent communication activity with, then the communication client application 112 may modify the displayed tabbed sidebar by displaying an avatar 402 associated with User I at the top of the recent activity list and shift the remaining avatars 402a-402g down to be positioned under the avatar 402 associated with User I. In this scenario the communication client application 112 continues to control the user interface provided by the communication client application 112 to display the further layer of content 403 which displays detailed information on the communication session with User B 110, and alters the position of the indicator 410 such that it remains being displayed alongside the avatar 402*a* of User B 110 in its new position in the displayed tabbed sidebar.

Similarly, if User A 104 receives a communication event (e.g. an instant message) from a user (e.g. one of Users C-H) that User A 104 has had recent communication activity with, then the communication client application 112 may modify the displayed tabbed sidebar by displaying the avatar 402 associated with the User at the top of the recent activity list and shift the remaining avatars 402 down to be positioned under the avatar 402 associated with User that transmitted the instant message.

Alternatively or additionally, if User A 104 receives a communication event (e.g. an instant message) from a user (e.g. User C-H) that User A 104 has had recent communication activity with, then the communication client application 112 may modify the displayed tabbed sidebar by displaying a visual indication next to, on, or around the avatar 402 associated with the User that transmitted the instant message to alert User A 104 to the received communication event.

In contrast to embodiments described above, in response to detecting a selection of a selectable input associated with a recent communication session with User B 110 that is displayed on the layer of content 401 that is displayed when the communication client application 112 is operating in the full screen mode (illustrated in FIG. 4*a*), the communication client application 112 may control the user interface provided by the communication client application 112 to continue operating in the full screen mode.

That is, with the layer of content 401 displaying the recent communication activity associated with User A 104 still being rendered on the display 204 by the OS 214, the communication client application 112 may add the further layer of content comprising detailed information on the communication session with User B 110 to the navigation backstack (on top of the layer of content 401) and provide the further layer of content 403 to the OS 214 for rendering on the display 204 to fully overlap the layer of content 401 displaying the recent communication activity associated with User A 104 (such that no portion of the layer of content 401 is displayed in the available display area 400 of the display 204). The further layer of content 403 displays detailed information on the communication session with User B 110 in the available display area 400 e.g. a chat view featuring all conversation and call history with User B 110. This is depicted in the right-hand illustration in FIG. 4*b*.

User A 104 may then make a selection (e.g. a left-to-right finger swipe) to control the user interface provided by the communication client application 112 to operate in the split-view mode (depicted in the right-hand illustration of FIG. 4*a*) or to continue operating in the full screen mode whereby the layer of content 401 displaying the recent communication activity associated with User A 104 is displayed on the display 204 (depicted in the right-hand illustration of FIG. 4*c*).

As explained above, whilst embodiments of the present disclosure have been described with reference to the client application being a communication client application, this is merely an example to illustrate the concepts. Embodiments extend to other types of client applications which display a window of content comprising a plurality of selectable inputs (e.g. icons, tabs, buttons, images, text etc.) that provides links to further content associated with the respect selectable inputs.

As described above, the client user interface provided by the communication client application 112 displays content in the available area 400 of the display 204. As depicted in FIGS. 4*a-c*, the available area 400 of the display 204 is the whole of the display. However, it is envisaged that the available area of the display (that is the area available to the communication client application 112) may constitute only a portion of the display e.g. with the remainder of the display being used by the OS 214 and/or other application(s) executed thereon to display other content.

Whilst dragging of the further layer of content 403 in certain directions has been described above, these directions pertain to the example shown in FIGS. 4*a-c* whereby the plurality of selectable inputs is displayed along the left-side edge of the layer of content 401 that displays the recent communication activity associated with User A 104. It will be appreciated that the direction (e.g. leftward, rightward, upward, downward etc.) in which the further layer of content 403 is dragged is dependent on the position of the plurality of selectable inputs displayed on the layer of content 401.

As described above, according to one aspect of the present disclosure there is provided a user terminal comprising: a display having an available display area; one or more processors configured to run a client application having a user interface capable of operating in a full screen mode whereby a single layer of content is displayed in the available display area or in a split-view mode to display content; wherein the client application is configured to: detect, whilst controlling the user interface to operate in the full screen mode, a user selection that the user interface operates in the split-view mode, and in response display a first layer of content in a predetermined position to partially overlap a second layer of content in the available display area such that a portion of the second layer of content is displayed in the available display area and a remaining portion of the second layer of content is not displayed in the available display area; and display an indicator providing an indication of how content displayed on the first layer of content is related to content displayed on the portion of the second layer of content.

The second layer of content may be displayed in the available display area in the full screen mode.

In this embodiment, the user selection that the user interface operates in the split-view mode is a selection of a selectable input displayed on the second layer of content.

The first layer of content may be selected for display in dependence on said selection of the selectable input.

The display may be touch-sensitive, and the client application may be configured to detect the user selection based on detection of a tap gesture on the touch-sensitive display.

The user terminal may be coupled to a computer mouse, and the client application may be configured to detect the user selection based on an input received from the computer mouse.

The first layer of content may be displayed in the available display area in the full screen mode, the first layer of content completely overlapping the second layer of content that is rendered on the display.

In this embodiment, the user selection that the user interface operates in the split-view mode may be dragging of the first layer of content in a direction to within a threshold area of the available display area.

The display may be touch-sensitive, the client application may be configured to detect the user selection based on detection of a swipe gesture in said direction on the touch-sensitive display.

The user terminal may be coupled to a computer mouse, and the client application may be configured to detect the selection of the selectable input based on an input received from the computer mouse.

The client application may be further configured to detect, whilst controlling the user interface to operate in the split-view mode, a user selection of a selectable input displayed on the second layer of content, and in response, remove the first layer of content and display a further layer of content in the predetermined position to partially overlap the second layer of content, wherein the further layer of content is selected for display in dependence on said selection of the selectable input.

The client application may be further configured to detect, whilst controlling the user interface to operate in the split-view mode, a user selection that the user interface operates in the full screen mode, and in response display the first layer of content to fully overlap the second layer of content in the available display area such that no portion of the second layer of content is displayed in the available display area.

The user selection that the user interface operates in the full screen mode may be dragging of the first layer of content in a direction outside of a threshold area of the available display area.

The client application may be further configured to detect, whilst controlling the user interface to operate in the split-view mode, an event associated with content displayed on the second layer of content, and in response modify the portion of the second layer of content that is displayed in the available display area to alert a user of the user terminal to said event.

The predetermined position may be dependent on the content displayed on the second layer of content.

The indicator may be displayed on at least one of the first layer of content and the second layer of content.

The available display area may be the whole of the area of a display screen of the device.

The client application may be a communication client application configured to exchange communication events over a communication network with other user terminals.

In this embodiment, the second layer of content may comprise information related to at least one communication session conducted by the user of the user terminal with one or more further users, and the first layer of content comprises information on communication events exchanged in a selected one of said communication sessions.

The steps shown separately in FIG. 3 may or may not be implemented as separate steps, and may or may not be implemented in the order shown.

Generally, any of the functions described herein can be implemented using software, firmware, hardware (e.g., fixed logic circuitry), or a combination of these implementations. The terms "functionality" and "application" as used herein generally represent software, firmware, hardware, or a combination thereof. In the case of a software implementation, the functionality or application represents program code that performs specified tasks when executed on a processor (e.g. CPU or CPUs). The program code can be stored in one or more computer readable memory devices. The features of the techniques described below are platform-independent, meaning that the techniques may be implemented on a variety of commercial computing platforms having a variety of processors.

For example, the user terminals may also include an entity (e.g. software) that causes hardware of the user terminals to perform operations, e.g., processors functional blocks, and so on. For example, the user terminals may include a computer-readable medium that may be configured to maintain instructions that cause the user terminals, and more particularly the operating system and associated hardware of the user terminals to perform operations. Thus, the instructions function to configure the operating system and associated hardware to perform the operations and in this way result in transformation of the operating system and associated hardware to perform functions. The instructions may be provided by the computer-readable medium to the user terminals through a variety of different configurations.

One such configuration of a computer-readable medium is signal bearing medium and thus is configured to transmit the instructions (e.g. as a carrier wave) to the computing device, such as via a network. The computer-readable medium may also be configured as a computer-readable storage medium and thus is not a signal bearing medium. Examples of a computer-readable storage medium include a random-access memory (RAM), read-only memory (ROM), an optical disc, flash memory, hard disk memory, and other memory devices that may use magnetic, optical, and other techniques to store instructions and other data.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A user terminal comprising:
a display having an available display area; and
one or more processors configured to execute instructions to:
detect, whilst controlling a user interface to operate in a full screen mode, a user selection to operate the user interface in a split-view mode;
add, responsive to detecting the user selection to operate in the split-view mode, a first layer of content to a navigation hierarchy over a second layer of content in the navigation hierarchy, the split-view mode displaying content from both the first layer of content in the navigation hierarchy and the second layer of content in the navigation hierarchy;
display, in the available display area, the first layer of content and the second layer of content, the first layer of content displayed in a predetermined position to partially overlap the second layer of content, the predetermined position exposing a first portion of the second layer of content concurrently with the first layer of content, the first portion of the second layer of content comprising multiple selectable inputs each representing a different respective communication session, and the first layer of content including a detailed view of a communication session represented by a particular selectable input of the multiple selectable inputs, each of the first layer of content and the first portion of the second layer of content being configured for user interaction, said display of the first layer of content causing a second portion of the second layer of content not to be displayed in the available display area;
receive an input in the second layer of content effective to cause a change in the display of the first layer of content, while the first portion of the second layer and the first layer are concurrently displayed; and display an indicator providing an indication of how content displayed on the first layer of content is related to content displayed on the displayed first portion of the second layer of content.

2. The user terminal of claim 1, wherein the second layer of content is displayed in the available display area in the full screen mode.

3. The user terminal of claim 2, wherein the user selection that the user interface operates in the split-view mode is a selection of a selectable input displayed on the second layer of content.

4. The user terminal of claim 3, wherein the first layer of content is selected for display in dependence on said selection of the selectable input.

5. The user terminal of claim 1, wherein the one or more processors are further configured to execute instructions to receive a further user selection to cause the first layer of content to be displayed in the available display area in the full screen mode, the first layer of content completely overlapping the second layer of content that is rendered on the display.

6. The user terminal of claim 5, wherein the further user selection is dragging of the first layer of content in a direction to outside a threshold area of the available display area, the dragging comprising one of: a swipe gesture in the direction on a touch-sensitive display, or a movement of a cursor detected via a computer mouse.

7. The user terminal of claim 5, further comprising receiving an additional user selection to cause the user interface to return to the split-view mode.

8. The user terminal of claim 7, wherein the additional user selection comprises dragging the first layer of content in a direction to within a threshold area of the available display area.

9. The user terminal of claim 1, wherein the input in the second layer of content comprises selection of a different selectable input displayed on the second layer of content, and the change in the display of the first layer of content comprises removing the first layer of content from the navigation hierarchy and from the available display area and adding a further layer of content to the navigation hierarchy and to the available display area in the predetermined position to partially overlap the second layer of content, wherein the further layer of content is selected for display in dependence on said selection of the different selectable input.

10. The user terminal of claim 1, wherein the input in the second layer of content causes a change in the portion of the second layer of content that is displayed in the available display area to alert a user of the user terminal to the input.

11. The user terminal of claim 1, wherein the predetermined position is dependent on content displayed on the second layer of content, to leave the multiple selectable inputs of the second layer exposed.

12. The user terminal of claim 1, wherein the indicator is displayed on at least one of the first layer of content and the second layer of content.

13. The user terminal of claim 1, wherein the available display area is the whole of an area of a display screen of the user terminal.

14. The user terminal of claim 1, wherein the instructions comprise communication client application software configured to exchange communication events over a communication network with one or more other user terminals.

15. The user terminal of claim 1, wherein the first layer of content is scaled to fill a portion the available display area that corresponds to the predetermined position.

16. The user terminal of claim 1, wherein both the first portion and the second portion of the second layer of content are rendered for display when the second portion of the second layer of content is not displayed.

17. The user terminal of claim 1, wherein the input in the second layer of content comprises receiving a new communication event, and the change comprises a change in a position of the indicator.

18. The user terminal of claim 1, wherein the display of the first layer of content in the predetermined position causes a portion of the first layer of content to not be displayed in the available display area.

19. At least one hardware computer readable storage medium storing a client application having a user interface and which, when executed on one or more processors of a user terminal comprising a display having an available display area, is configured to:

detect, whilst controlling the user interface to operate in a full screen mode, a user selection that the user interface operates in a split-view mode;

add, responsive to detecting the user selection, a first layer of content to a navigation backstack over a second layer of content, the split-view mode displaying content from both the first layer of content and the second layer of content of the navigation backstack;

display the first layer of content, based on the user selection, in a predetermined position to partially overlap the second layer of content in the available display area such that a first portion of the second layer of content is displayed in the available display area and a second portion of the second layer of content is not displayed in the available display area, the first portion of the second layer of content comprising multiple selectable inputs each representing a different respective communication session, and the first layer of content including a detailed view of a communication session represented by a particular selectable input of the multiple selectable inputs, the first layer of content and the displayed first portion of the second layer of content each configured for user interaction while being concurrently displayed;

receive an input in the second layer of content effective to cause a change in the display of the first layer of content, while the first portion of the second layer and the first layer are concurrently displayed; and display an indicator providing an indication of how content displayed on the first layer of content is related to content displayed on the displayed first portion of the second layer of content.

20. A method comprising:

detecting, whilst controlling a user interface of a client application to operate in a full screen mode, a user selection that the user interface operates in a split-view mode;

adding, responsive to detecting the user selection, a first layer of content to a navigation hierarchy over a second layer of content in the navigation hierarchy, the split-view mode displaying content from both the first layer of content and the second layer of content in the navigation hierarchy;

displaying the first layer of content, based on the user selection, in a predetermined position to partially overlap the second layer of content in the available display area such that a first portion of the second layer of content is displayed in the available display area and a second portion of the second layer of content is not displayed in the available display area, the first portion of the second layer of content comprising multiple selectable inputs each representing a different respective communication session, and the first layer of content including a detailed view of a communication session represented by a particular selectable input of the multiple selectable inputs, the first layer of content and the displayed first portion of the second layer of content each configured for user interaction while concurrently being displayed;

receiving an input in the second layer of content effective to cause a change in the display of the first layer of content, while the first portion of the second layer and the first layer are concurrently displayed; and displaying an indicator providing an indication of how content displayed on the first layer of content is related to content displayed on the displayed first portion of the second layer of content.

21. A system comprising:

one or more processors; and one or more computer-readable storage devices storing instructions that are executable by the one or more processors to cause the system to perform operations including:

detecting, whilst controlling a user interface of a client application to operate in a full screen mode, a user selection that the user interface operates in a split-view mode;

adding, responsive to detecting the user selection, a first layer of content to a navigation hierarchy over a second layer of content in the navigation hierarchy, the split-view mode displaying content from both the first layer of content and the second layer of content in the navigation hierarchy;

displaying the first layer of content, based on the user selection, in a predetermined position to partially overlap the second layer of content in the available display area such that a first portion of the second layer of content is displayed in the available display area and a second portion of the second layer of content is not displayed in the available display area, the first portion of the second layer of content comprising multiple selectable inputs each representing a different respective communication session, and the first layer of content including a detailed view of a communication session represented by a particular selectable input of the multiple selectable inputs, the first layer of content and the displayed first portion of the second layer of content each configured for user interaction while concurrently being displayed;

receiving an input in the second layer of content effective to cause a change in the display of the first layer of content, while the first portion of the second layer and the first layer are concurrently displayed; and displaying an indicator providing an indication of how content displayed on the first layer of content is related to content displayed on the displayed first portion of the second layer of content.

* * * * *